(12) United States Patent
Woods et al.

(10) Patent No.: US 10,408,243 B2
(45) Date of Patent: Sep. 10, 2019

(54) WHEEL NUT INDICATOR

(71) Applicants: Richard Edwin Woods, Canterbury (GB); David Michael Godbold, Punnetts Town (GB)

(72) Inventors: Richard Edwin Woods, Canterbury (GB); David Michael Godbold, Punnetts Town (GB)

( * ) Notice: Subject to any disclaimer, the term of this patent is extended or adjusted under 35 U.S.C. 154(b) by 44 days.

(21) Appl. No.: 15/558,101

(22) PCT Filed: Oct. 26, 2015

(86) PCT No.: PCT/GB2015/053206
§ 371 (c)(1),
(2) Date: Sep. 13, 2017

(87) PCT Pub. No.: WO2016/146961
PCT Pub. Date: Sep. 22, 2016

(65) Prior Publication Data
US 2018/0051724 A1    Feb. 22, 2018

(30) Foreign Application Priority Data

Mar. 13, 2015    (GB) .................................. 1504318.5

(51) Int. Cl.
*F16B 1/00*    (2006.01)
*F16B 37/14*    (2006.01)
*B60B 3/16*    (2006.01)

(52) U.S. Cl.
CPC ............ *F16B 1/0071* (2013.01); *B60B 3/165* (2013.01); *F16B 37/14* (2013.01)

(58) Field of Classification Search
CPC ......... F16B 1/0071; F16B 37/14; B60B 3/165

USPC .............................................. 116/328; 33/494
See application file for complete search history.

(56) References Cited

U.S. PATENT DOCUMENTS

| 5,048,197 A | * | 9/1991 | Anderson | G01B 3/40 |
| | | | | 285/333 |
| 5,276,971 A | * | 1/1994 | Brewster | G01B 3/48 |
| | | | | 33/199 R |
| 6,145,207 A | * | 11/2000 | Brunson | G01B 3/205 |
| | | | | 33/199 B |

(Continued)

FOREIGN PATENT DOCUMENTS

| DE | 2658827 A1 | 7/1978 |
| DE | 102007015447 A1 | 10/2008 |

(Continued)

OTHER PUBLICATIONS

UK Search Report for UK Patent Application No. GB1504318.5. dated May 13, 2015. 1 page.

(Continued)

*Primary Examiner* — Justin Seo
*Assistant Examiner* — Tania C Courson
(74) *Attorney, Agent, or Firm* — Gearhart Law LLC

(57) ABSTRACT

A wheel nut indicator 10 includes an attachment section 12 for fitting to a wheel nut/lug nut of a wheel and a pointer section 14 extending radially away from the attachment section 12, the wheel nut indicator 10 being provided with a changeable secondary indication means which is moveable between a first position (FIG. 1) for indicating a first status, and a second position (FIG. 3) for indicating a second status.

13 Claims, 4 Drawing Sheets

(56) References Cited

U.S. PATENT DOCUMENTS

| | | | | |
|---|---|---|---|---|
| 6,381,861 | B1* | 5/2002 | Deterling | G01B 5/08 |
| | | | | 33/199 R |
| 6,398,312 | B1 | 6/2002 | Marczynski | |
| 8,769,799 | B2* | 7/2014 | Emmerich | F16B 35/04 |
| | | | | 29/525.02 |
| 8,950,990 | B2* | 2/2015 | Dooner | B60B 3/165 |
| | | | | 411/13 |
| 9,689,653 | B2* | 6/2017 | Baskovic | G01B 3/20 |
| 2002/0089231 | A1* | 7/2002 | Marczynski | F16B 1/0071 |
| | | | | 301/37.374 |
| 2009/0035090 | A1 | 2/2009 | Case | |
| 2010/0296892 | A1 | 11/2010 | Rogers et al. | |
| 2011/0296668 | A1 | 12/2011 | Emmerich | |
| 2013/0087091 | A1 | 4/2013 | Dooner | |

FOREIGN PATENT DOCUMENTS

| | | |
|---|---|---|
| GB | 1541769 A | 3/1979 |
| GB | 2085347 | 7/1999 |
| GB | 2446406 | 8/2008 |
| GB | 2458644 | 9/2009 |
| GB | 2508152 | 5/2014 |

OTHER PUBLICATIONS

International Search Report and Written Opinion for PCT Application No. PCT/GB2015/053206. dated Feb. 9, 2016. 11 pages.
UK Examination Report for UK Patent Application No. GB1504318.5. dated Mar. 29, 2017. 2 pages.
Wheelsafety Surepoint. www.wheelsafety.co.uk/history-wheelnutindicator. Accessed Sep. 28, 2015.
"HGV driver's daily Walkaround Checks." YouTube, uploaded Dec. 9, 2011, www.youtube.com/watch?v=l4iWawNHanc. Accessed Sep. 13, 2017.
Installation Procedures for Wheel-Check. http://www.wheel-check.com/installation.html. Accessed on Sep. 13, 2017.

* cited by examiner

WHEEL NUT INDICATOR

CLAIM OF PRIORITY

This application is a national stage entry of PCT/GB2015/053206 filed on Oct. 26, 2015 which claims priority to GB1504318.5 filed on Mar. 13, 2015, the contents of both of which are herein fully incorporated by reference in its entirety.

FIELD OF INVENTION

The present invention relates to a wheel nut indicator, and particularly to a wheel nut indicator having a movable secondary indication means.

BACKGROUND TO THE INVENTION

Wheel nut indicators are well known, and are considered an important safety feature for large vehicles, for example buses and trucks. A wheel nut indicator is generally in the form of a plastic cap or surround, which fits over the wheel nuts/lug nuts on a vehicle wheel, and which has some kind of pointer. When the wheel nut indicators are installed over the nuts, the pointers will be oriented in a particular direction, for example, the pointers may all be oriented so that they point clockwise around the wheel, or alternatively the pointers of adjacent wheel nuts may point towards each other. The purpose of this is so that any rotation of a wheel nut (because it is becoming loose) will be immediately obvious on visual inspection, because the pointer of the wheel nut indicator will no longer be pointing in the correct direction. As a matter of routine, a driver will carry out a defect check on a vehicle before driving it, and will check the indicators on each wheel. Any problems with loose nuts will therefore be detected and corrected before they become dangerous.

When a wheel is removed for whatever reason (for example to replace the tyre or service the brakes), wheel nuts will be fitted and tightened, and wheel nut indicators will be fitted over the nuts. It is then standard practice to require checking and re-torqueing after the vehicle has been driven a short distance, for example 40-80 km. Generally a paper document is given to the driver, and it is the driver's responsibility to ensure that the vehicle is returned for re-torqueing after that distance. However, there could be times when this paper system is less effective than desired. For example, the document may be lost, a driver change may occur with the paperwork not being handed over, or the wheel might be removed and refitted when there is no driver to hand the paperwork over to. Likewise, repairs might have to be made to dismounted trailers in yards/docks etc.

All of these events could lead to a re-torqueing policy being inconsistently applied. Even if a driver remembers that re-torqueing is required, a situation may arise where he or she incorrectly identifies which wheel is affected, if the paperwork is misplaced or unreadable, for example because it is covered in dirt or grease.

It is an object of the invention to reduce or substantially obviate the above mentioned problems.

SUMMARY OF INVENTION

According to the present invention, there is provided a wheel nut indicator including an attachment section for fitting to a wheel nut/lug nut of a wheel and a pointer section extending radially away from the attachment section, the wheel nut indicator being provided with a moveable secondary indication means which is movable between a first position for indicating a first status, and a second position for indicating a second status.

The moveable secondary indication means allows the wheel nut indicator to indicate either of the first status or the second status. The status indicated may be changed, without removing or replacing the wheel nut indicator from the wheel nut/lug nut, by moving the secondary indication means of the wheel nut indicator. The secondary indication means may be movable with respect to the rest of the wheel nut indicator, in particular with respect to the attachment section.

The wheel nut indicator functions as an ordinary indicator, having a pointer for use as described above, so that any loosening of nuts can be detected visually. In addition, the secondary indication means can be used for recording a status of a nut, for example if the nut is newly fitted and therefore needs to be re-torqued after a short distance. When a wheel is removed and replaced, the wheel nut indicators can be fitted over the wheel nuts/lug nuts and the pointers aligned conventionally. The secondary indication means can be set in the first position to indicate that the nuts will need re-torqueing. Before driving his vehicle, a driver will check all wheels as is already standard practice. In addition to noting the position of the pointers on the wheel nut indicators, he will note the position of the secondary indication means. This serves as a reminder that the wheel has recently been changed and will therefore need re-torqueing, even if the driver has lost his paperwork or has taken over the vehicle from another driver.

When the wheel is checked and re-torqued, the secondary indication means on each wheel nut indicator can be moved to the second position, to indicate that this operation has been completed. This can be done without removing the wheel nut indicators, and does not require the driver or service mechanic to carry a supply of wheel nut indicators.

Preferably, the secondary indication means displays a first colour in the first position and a second colour in the second position. Colour is generally a good way of communicating status information, allowing a quick visual check. For example, the first colour may be green, indicating "safe" and the second colour may be red, indicating that the nuts need to be checked and re-torqued.

The secondary indication means may move in any of a number of ways. For example, it may include a slider, a rotatable element, or any other moveable part.

It is particularly preferable to provide the secondary indication means as part of the pointer of the wheel nut indicator. Preferably, substantially the entire surface area of the pointer provides visible status information, since drivers are already used to checking the pointers on their wheel nut indicators. In one embodiment, one side of the pointer displays a first status (for example the surface on that side may be a first colour) and the other side of the pointer displays the second status (for example the surface may be a second colour). The pointer is rotated so that the first side is facing away from the wheel in the first position and the second side is facing away from the wheel in the second position. This rotation may be about an axis which extends radially away from the attachment section.

Preferably, holding means are provided for holding the secondary indication means in the set position. It is important to ensure that the secondary indication means cannot move between positions due to vibrations when the vehicle is being driven.

In one embodiment, the pointer is provided with a substantially cylindrical hole extending through the centre of the pointer, in a radial direction away from the attachment section. The attachment section may be provided with a radially extending pin so that the cylindrical hole of the pointer may fit over the pin, and the whole pointer may rotate about the pin. The pointer may then be rotated so that either its first face or its second face faces away from the wheel in use.

The holding means may be in the form of one or more extensions from an edge of the pointer, the extensions fitting within apertures in a wall of the attachment section, the edge of the pointer being placed against the wall of the attachment section in use and the extensions therefore fitting within the apertures and preventing rotation. To rotate the pointer with respect to the attachment section to move the secondary indication means to a different position, the pointer must be pulled away from the attachment section so that the extensions on the pointer clear the apertures on the attachment section, then rotated, and then pushed back towards the attachment section so that the extensions fit back within the apertures, and the secondary indication means is locked in its new position.

Preferably, a spring is provided for urging the pointer towards the attachment section. In this way, force has to be applied against the spring to move the extensions clear of the apertures and rotate the pointer. When the pointer is in its new position, the extensions will tend to snap into the apertures to lock the secondary indication means in position automatically.

It will be clear that the extensions might alternatively be provided on the attachment means, with the pointer being provided with corresponding apertures.

Preferably the attachment means is in the form of a cap which has an open end for fitting substantially over a wheel nut/lug nut of a wheel. The pointer may be provided substantially adjacent the open end of the cap, or alternatively substantially adjacent the other (closed) end.

DESCRIPTION OF THE DRAWINGS

For a better understanding of the present invention, and to show more clearly how it may be carried into effect, preferred embodiments will now be described by way of example only, with reference to the accompanying drawings in which.

DESCRIPTION OF THE PREFERRED EMBODIMENTS

Figure 1:
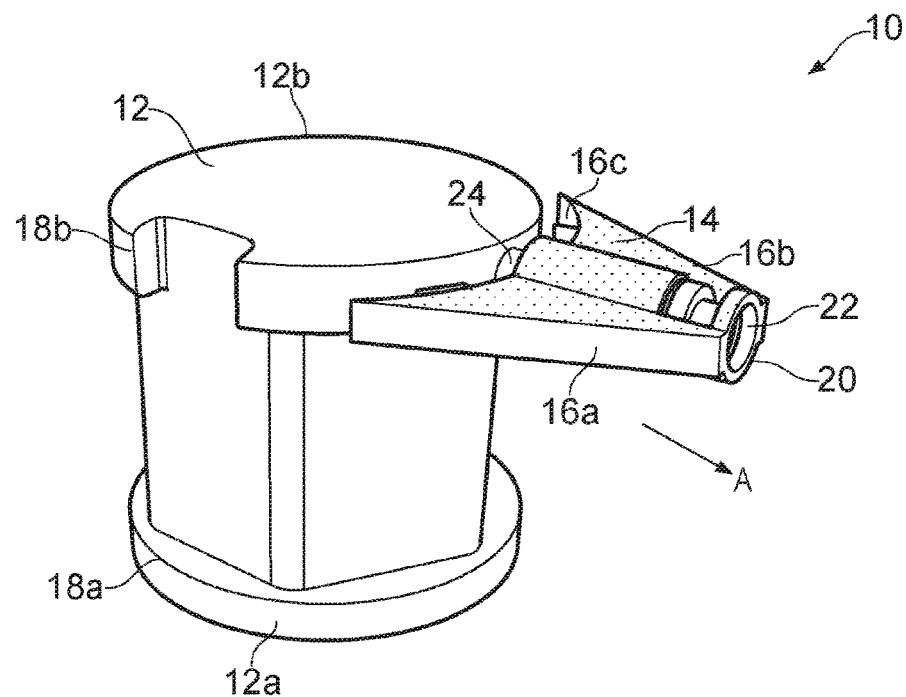
FIG. 1 is a perspective view of a wheel nut indicator according to the invention, with the secondary indication means in the first position showing a first indicia, in this example a first colour, and indicating a first status.
Figure 2:
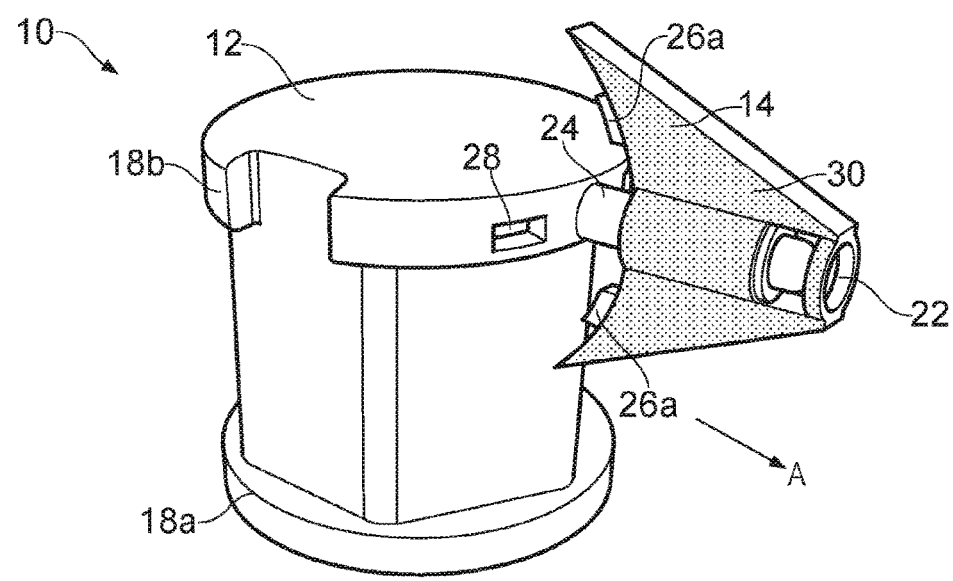
FIG. 2 is a perspective view of the wheel nut indicator of FIG. 1, while the secondary indication means is being moved to the second position showing a second indicia, in this example a second colour, and indicating a second status.
Figure 3:
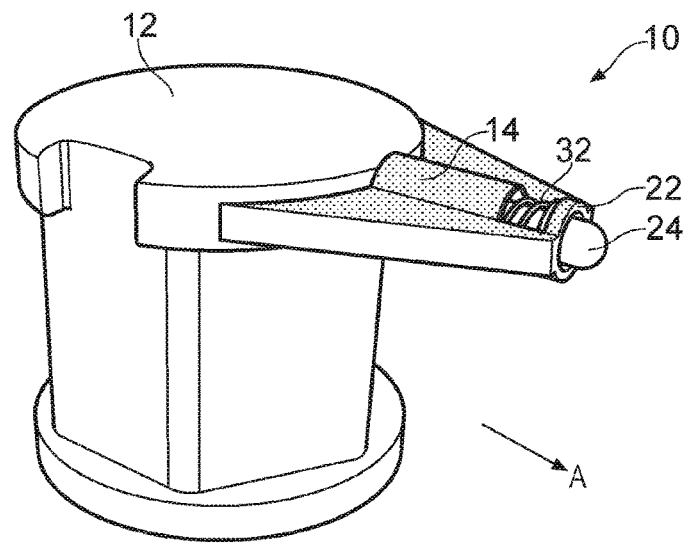
FIG. 3 is a perspective view of the wheel nut indicator of FIG. 1, with the secondary indication means in the second position.

Referring to FIGS. 1 to 3, it is clear how the pointer section 14 may be rotated with respect to the attachment section 12. The cylindrical aperture 22 of the pointer section 14 fits over and around a radially extending pin 24, which protrudes from the attachment section 12. Extensions 26a, 26b are provided on the curved edge 16c of the pointer 14, and correspond with apertures 28 on the curved outer surface of the short cylindrical end section 18b. The pointer section 14 can be pulled in the direction of arrow A to move the extensions 26a, 26b clear of the apertures 28, and the pointer section 14 can then be rotated about the pin 24, as shown in FIG. 2. The pointer section 14 is shown in FIG. 3, with the other side facing away from the wheel in use (substantially upwards in the Figures). Since the two sides of the pointer section 14 are different colours, and also one side may include indicia 30 to indicate that the nuts need re-torqueing, the rotatable pointer section 14 as described works as a secondary indication means.

Figure 4:
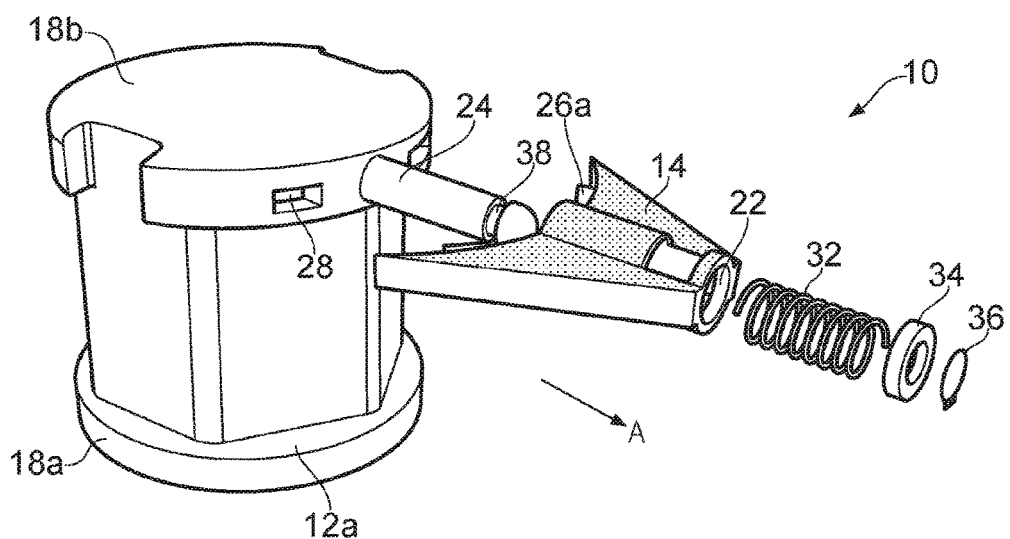
FIG. 4 is an exploded view of the wheel nut indicator of FIG. 1.

Referring now in particular to FIG. 4, a spring 32 is provided for urging the pointer 14 radially towards the attachment means 12. In other words, the spring 32 urges the pointer 14 in a direction opposite to arrow A. The spring sits against a detent (not seen in the drawings) at the curved edge end of the cylindrical aperture 22 of the pointer 14. The spring is held at the other end by a washer 34 and a snap ring 36, in a recess 38 towards a distal end of the pin 24.

Figure 5:
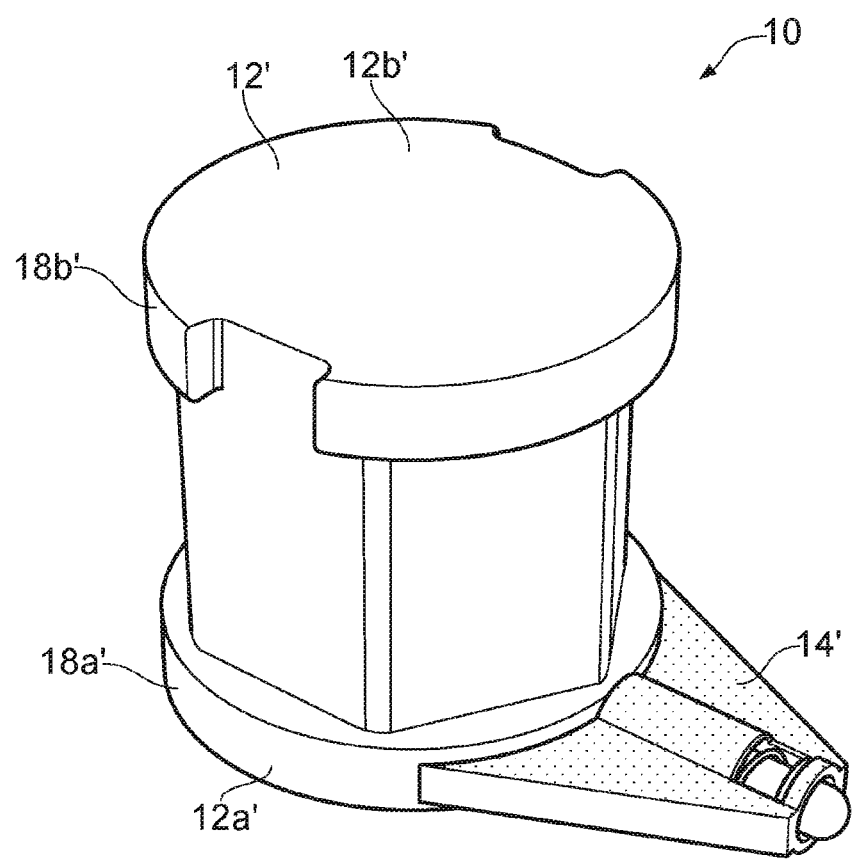
FIG. 5 is a perspective view of a second embodiment of a wheel nut indicator according to the invention.

In FIG. 5, a second embodiment of a wheel nut indicator 10' is illustrated. This embodiment is substantially identical to the first embodiment 10, save that the pointer 14' is provided adjacent the lower short cylindrical end section 18a', i.e. next to the open end 12a' of the attachment section 12. The pointer will therefore sit substantially against the surface of a wheel, when fitted.

Figure 6:
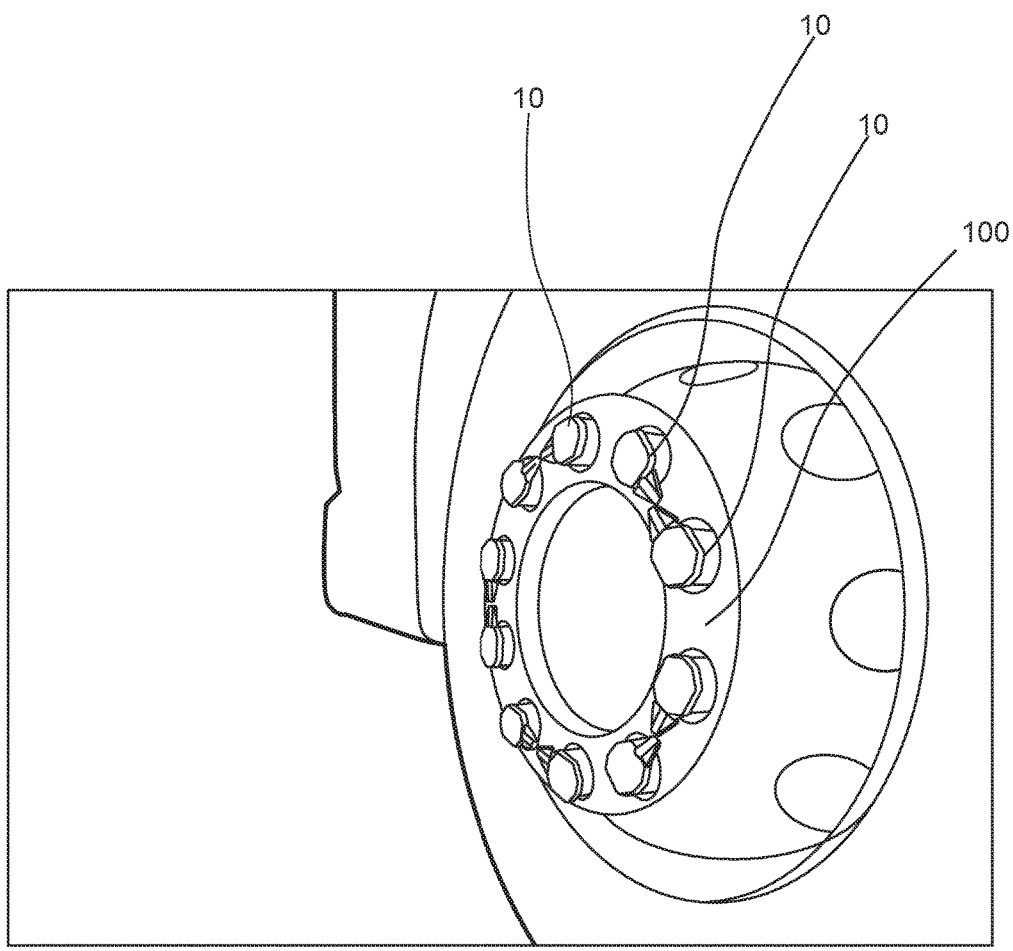
FIG. 6 shows a plurality of the wheel nut indicators of FIG. 1, in use and installed on the lug nuts of a vehicle wheel.

The wheel nut indicators 10, 10' provide all the normal features of a wheel nut indicator, in that they provide a ready visual indication if a nut has rotated in use. In addition, the pointer 14 of the wheel nut indicator may be rotated when a wheel is removed and replaced, as a reminder that the nuts will shortly require re-torqueing. This provides a valuable extra safety feature, and takes advantage of the fact that drivers already inspect their wheel nut indicators as a matter of course. FIG. 6 shows a plurality of the wheel nut indicators 10 installed over the lug nuts of a vehicle wheel 100.

The embodiments described above are provided by way of example only, and various changes and modifications will be apparent to persons skilled in the art without departing from the scope of the present invention as defined by the appended claims.

The invention claimed is:

1. A wheel nut indicator including an attachment section for fitting to a wheel nut/lug nut of a wheel and a pointer section extending radially away from the attachment section, the wheel nut indicator being provided with a moveable secondary indication means which is moveable between a first position for indicating a first status, and a second position for indicating a second status, either of the first position or the second position of the moveable secondary indicator being selectable when the wheel nut indicator is attached to a wheel nut/lug nut.

2. A wheel nut indicator as claimed in claim 1, in which first indicia is displayed in the first position and second indicia is displayed in the second position.

3. A wheel nut indicator as claimed in claim 2, in which the first indicia is a first colour and the second indicia is a second colour.

4. A wheel nut indicator as claimed in claim 1, in which the movable secondary indicator includes a rotatable element.

5. A wheel nut indicator as claimed in claim 4, in which the rotatable element rotates on an axis which extends substantially away from the attachment section.

6. A wheel nut indicator as claimed in claim 5, in which the axis extends away from the attachment section in a radial direction.

7. A wheel nut indicator as claimed in claim 1, in which the movable secondary indicator is the pointer.

8. A wheel nut indicator as claimed in claim 1, in which holding means are provided for holding the secondary indicator in position.

9. A wheel nut indicator as claimed in claim 8, in which one or more extensions are provided on an edge of one of the movable secondary indicator and the attachment section, and in which corresponding aperture(s) are provided on the other of the movable secondary indicator and the attachment section, the extensions cooperating with the apertures to prevent rotation.

10. A wheel nut indicator as claimed in claim 8, in which the holding means are urged into a held configuration by a spring.

11. A wheel nut indicator as claimed in claim 1, in which the attachment section is in the form of a cap for fitting substantially over a wheel nut/lug nut of a wheel, the cap having an open end and a closed end.

12. A wheel nut indicator as claimed in claim 11, in which the pointer and the secondary indicator are provided adjacent the closed end of the cap.

13. A wheel nut indicator as claimed in claim 11, in which the pointer and the secondary indicator are provided adjacent the open end of the cap.

* * * * *